(12) United States Patent
Wille et al.

(10) Patent No.: US 9,789,479 B2
(45) Date of Patent: Oct. 17, 2017

(54) CATALYST WITH HIGHLY ANNEALED PD LAYER

(71) Applicant: Heraeus Precious Metals GmbH & Co. KG, Hanau (DE)

(72) Inventors: Ansgar Wille, Hanau-Mittelbuchen (DE); Marcus Bonifer, Offenbach (DE); Christian Breuer, Darmstadt (DE)

(73) Assignee: Heraeus Deutschland GmbH & Co. KG, Hanau (DE)

( * ) Notice: Subject to any disclaimer, the term of this patent is extended or adjusted under 35 U.S.C. 154(b) by 7 days.

(21) Appl. No.: 14/614,612

(22) Filed: Feb. 5, 2015

(65) Prior Publication Data

US 2015/0217285 A1    Aug. 6, 2015

(30) Foreign Application Priority Data

Feb. 6, 2014 (EP) .................................... 14154173

(51) Int. Cl.
*B01J 23/00* (2006.01)
*B01J 37/16* (2006.01)
(Continued)

(52) U.S. Cl.
CPC ............ *B01J 37/16* (2013.01); *B01D 53/945* (2013.01); *B01J 21/04* (2013.01); *B01J 23/10* (2013.01); *B01J 23/38* (2013.01); *B01J 23/42* (2013.01); *B01J 23/44* (2013.01); *B01J 23/462* (2013.01); *B01J 35/02* (2013.01); *B01J 37/08* (2013.01); *B01D 2255/1021* (2013.01); *B01D 2255/1023* (2013.01); *B01D 2255/1025* (2013.01); *B01D 2255/407* (2013.01); *B01D 2255/908* (2013.01); *B01D 2255/9022* (2013.01); *Y02T 10/22* (2013.01)

(58) Field of Classification Search
CPC ... B01J 37/16; B01J 23/38; B01J 37/08; B01J 23/10; B01J 23/44; B01J 35/02; B01J 23/462; B01J 21/04; B01J 23/42; B01D 53/945; B01D 2255/1023; B01D 2255/407; B01D 2255/1021; B01D 2255/908; B01D 2255/9022; B01D 2255/1025; Y02T 10/22
USPC .......................................... 502/325
See application file for complete search history.

(56) References Cited

U.S. PATENT DOCUMENTS

| 6,808,687 B1 | 10/2004 | Uenishi et al. |
| 2005/0255993 A1 | 11/2005 | Tanaka et al. |

(Continued)

FOREIGN PATENT DOCUMENTS

| DE | 10024994 A1 | 1/2001 |
| DE | 60216280 T2 | 5/2007 |

(Continued)

OTHER PUBLICATIONS

Singh et al, "Ce2/3Cr1/3O2+y: A New Oxygen Storage Material Based on the Fluorite Structure", Nov. 11, 2008, Solid State and Structural Chemistry Unit, Indian Institute of Science, Bangalore 560012, India, p. 7268-7273.*

(Continued)

*Primary Examiner* — Haytham Soliman
(74) *Attorney, Agent, or Firm* — Panitch Schwarze Belisario & Nadel LLP (57) ABSTRACT

The present invention relates to a method for producing a multilayer catalyst, to the multilayer catalyst produced by the method, and to the use of the catalyst for after-treatment of exhaust gases.

8 Claims, 4 Drawing Sheets

(51) Int. Cl.
  *B01J 23/44* (2006.01)
  *B01J 23/10* (2006.01)
  *B01J 21/04* (2006.01)
  *B01J 23/46* (2006.01)
  *B01J 23/42* (2006.01)
  *B01J 35/02* (2006.01)
  *B01J 37/08* (2006.01)
  *B01J 23/38* (2006.01)
  *B01D 53/94* (2006.01)

(56) References Cited

U.S. PATENT DOCUMENTS

| | | |
|---|---|---|
| 2005/0282701 A1 | 12/2005 | Foong et al. |
| 2008/0044330 A1 | 2/2008 | Chen et al. |
| 2009/0257933 A1 | 10/2009 | Chen et al. |

FOREIGN PATENT DOCUMENTS

| | | |
|---|---|---|
| DE | 112005001392 T5 | 8/2007 |
| EP | 1053779 A1 | 11/2000 |
| EP | 1399245 B1 | 11/2006 |
| EP | 2163303 A1 | 3/2010 |
| WO | 02083301 A2 | 10/2002 |
| WO | 2011109676 A2 | 9/2011 |

OTHER PUBLICATIONS

Extended European Search Report issued Jul. 9, 2014 in EP Application No. 14154173.0.

* cited by examiner

CATALYST WITH HIGHLY ANNEALED PD LAYER

BACKGROUND OF THE INVENTION

The present invention relates to a method for producing a multilayer catalyst, to the multilayer catalyst produced by the method, and to the use of the catalyst for after-treatment of exhaust gases.

It has long been customary, especially with regard to motor vehicles, to subject the exhaust gas of a combustion motor to after-treatment using a catalyst. The task of the catalyst is to convert the pollutants generated during combustion, i.e., hydrocarbons ($C_mH_n$), carbon monoxide (CO), and nitrogen oxides ($NO_x$), into the non-toxic substances carbon dioxide ($CO_2$), water ($H_2O$), and nitrogen ($N_2$). The following oxidation and reduction reactions take place in this process:

$$2CO+O_2 \rightarrow 2CO_2$$

$$2C_2H_6+7O_2 \rightarrow 4CO_2+6H_2O$$

$$2NO+2CO \rightarrow N_2+2CO_2$$

There are various types of catalysts. The best-known, aside from the three-way catalyst, are oxidation catalysts and $NO_x$ storage catalysts.

The three-way catalyst, also referred to as a controlled catalyst or "G-Kat," has become standard equipment in a motor vehicle fitted with a combustion engine. In this context, the term "controlled" refers to the motor management of the combustion. The three-way catalyst can only be used in vehicles equipped with a combustion engine and lambda control. In a three-way catalyst, the oxidation of CO and $H_mC_n$ and the reduction of $NO_x$ take place in parallel. This requires a constant air-fuel mixture at a stoichiometric ratio of lambda ($\lambda$) equal to 1.

In a combustion engine, the lambda probe ensures controlled combustion of the fuel. The lambda probe is used to determine the air-fuel ratio in the exhaust gas of the combustion engine. The measurement is based on the residual oxygen content present in the exhaust gas. The lambda probe is the main sensor in the control loop of the lambda control for catalytic after-treatment with a controlled catalyst and supplies the measured value to the motor control unit.

The lambda control establishes a desired lambda value in the exhaust gas of a combustion engine. In this context, lambda denotes the air-fuel ratio, which is the ratio of the mass of air available for combustion to the minimal stoichiometric mass of air required for complete combustion of the fuel. At the stoichiometric fuel ratio, exactly the amount of air required for complete combustion of the fuel is present. This is called $\lambda=1$. If more fuel is present, the mixture is called rich ($\lambda<1$), whereas an excess of air being present corresponds to a lean mixture ($\lambda>1$). If there is any deviation from the stoichiometric air-fuel ratio towards an excess of air, i.e., lean region, not all nitrogen oxides are decomposed, since the requisite reducing agents are being oxidized earlier. In the rich region, i.e., air deficit, not all hydrocarbons and not all of the carbon monoxide are decomposed.

The air-fuel equivalence ratio lambda, also called "air excess," air excess number," or "air ratio" for short, is a parameter of combustion technology. This parameter provides some feedback concerning the progress of the combustion, temperatures, generation of pollutants, and the efficiency. Proper fine-tuning of carburetor or fuel injection facility, and thus the adjustment of lambda, has a major impact on motor performance, fuel consumption, and the emission of pollutants.

Combustion engines are usually controlled to a narrow range of approx. $0.97<\lambda<1.03$. The range within these thresholds is called the lambda window. The best reduction of all three types of pollutants is attained within this window. At high motor performance, operating the engine with a rich mixture, and therefore colder exhaust gas, prevents the exhaust components, such as manifold, turbo-charger, and catalyst, from overheating.

To attain a value of $\lambda=1$ in operation, sufficient oxygen must be available in the catalyst in order to carry out the oxidation-reduction reactions indicated above. On the other hand, oxygen released during the reduction must be bound for the reduction of the nitrogen oxides to nitrogen to take place. Three-way catalysts usually contain an oxygen reservoir that is charged with oxygen at oxidizing conditions and can release oxygen again at reducing conditions.

In addition to the oxygen reservoir, a catalyst often also comprises at least one noble metal; usually this will be platinum, palladium and/or rhodium. If aluminum oxide is also used in a catalyst, it is important to ensure that the rhodium does not become applied onto the aluminum oxide. At elevated temperatures, the rhodium adsorbs to the porous structure of the aluminum oxide and is therefore no longer available for the actual catalytic reaction. Accordingly, EP 1053779 A1 describes a catalyst in which the catalytically active layer comprises a cerium complex oxide and a zirconium complex oxide. While palladium is situated on the cerium complex oxide, platinum and rhodium are applied onto the zirconium complex oxide.

DE 10024 994 A1 describes a catalyst in which the noble metals are applied onto a substrate as separate layers. The catalyst comprises a first coating layer formed on a heat-resistant substrate and a second coating layer formed on the first coating layer. The first coating layer contains aluminum oxide bearing palladium; the second coating layer contains cerium zirconium complex oxides bearing both platinum and rhodium.

During the production of the catalysts, it is customary to apply a first layer containing palladium onto the substrate. This layer is then annealed at a temperature of approx. 550° C. Subsequently, a second layer containing platinum and/or rhodium is applied and annealed at a temperature of approx. 450° C. A pertinent method is described, for example, in US 2009/257933 A1, US 2008/044330 A1 or WO 02/083301 A2. A temperature of 600° C. for annealing of the first and second layer is described in US 2005/0255993 A1.

Annealing the layers reduces the noble metal that is obtained in the form of a salt. As a result, approximately spherical particles of the corresponding noble metal are obtained. The noble metal particles are the active centers of the catalyst and the actual oxidation and/or reduction reactions take place on them. Accordingly, the production method has an impact on the catalytic activity of the catalyst. Obviously, the catalytic activity should be as high as possible so as to minimize the emission of pollutants, such as nitrogen oxides $NO_x$, carbon monoxide CO, and hydrocarbons HC, in the exhaust gas.

BRIEF SUMMARY OF THE INVENTION

It is therefore the object of the present invention to provide a method for producing a catalyst with improved catalytic activity as compared to known catalysts. In particular, the catalyst will enable a decrease in the emission of CO, HC, and $NO_x$ at both rich and lean operation of a combustion engine.

A method for producing a multilayer catalyst for exhaust gas after-treatment of combustion exhaust gases according to the invention, comprising the following steps:
 a) providing a substrate having a surface which contacts the gases to be cleaned;
 b) applying a first catalytically effective composition comprising a palladium salt onto the surface of the substrate to produce a first layer (A);
 c) annealing the first layer (A) at a first temperature $T_1$ for a period of time $t_1$ of five minutes or more;
 d) subsequently annealing the first layer (A) at a second temperature $T_2$ higher than $T_1$;
 e) applying a second catalytically effective composition comprising at least one of a platinum salt and a rhodium salt to produce a second layer (B), wherein the second layer (B) fully or partially covers the annealed layer (A); and
 f) annealing the second layer (B) at a third temperature $T_3$.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Surprisingly, it has been found that a catalyst in which the first layer is first annealed at a lower temperature and then at a higher temperature facilitates lower emission of $NO_x$, CO, and HC as compared to conventional catalysts at both lean and rich motor conditions. Therefore, the underlying object of the present invention is met in a first embodiment by a method for producing a multilayer catalyst for exhaust gas after-treatment of combustion exhaust gases comprising the following steps:
 a) providing a substrate whose surface contacts gases to be cleaned;
 b) applying a first catalytically effective composition, which comprises palladium in the form of a salt, onto the surface of the substrate in order to produce a first layer (A);
 c) annealing the first layer (A) at a first temperature $T_1$ for a period of time $t_1$ of five minutes or more;
 d) subsequently annealing the first layer (A) at a second temperature $T_2$ higher than $T_1$;
 e) applying a second catalytically effective composition which comprises platinum and/or rhodium, each in the form of a salt, in order to produce a second layer (B), in which the second layer (B) fully or partially covers the annealed layer (A); and
 f) annealing the second layer (B) at a third temperature $T_3$.

The substrate onto which the first catalytically effective layer is applied is first annealed at a first temperature $T_1$. According to the present invention, the term "annealing" maybe understood to mean a step of calcination, and the terms annealing and calcination, are used synonymously. During prior art heating steps, liquid that may be present is removed from the catalytically effective layer. However, there is no chemical or structural change of the composition.

In contrast, the annealing at temperatures $T_1$ and $T_3$ involves the reduction of the noble metal salt or noble metal salts present in the first and second composition, respectively, which leads to the formation of noble metal centers (noble metal particles) in the respective layers. The second annealing at a temperature $T_2$ which is higher than temperature $T_1$ leads to ageing of the first layer. Surprisingly, it has been found that annealing at temperature $T_2$ has an impact on the composition to the effect that the palladium particles thus obtained are particularly well-suited for reaction with nitrogen oxides $NO_x$. Preferably, the noble metals are present in the form of nitrate salts which may be obtained inexpensively and may be easily processed in the method according to the invention.

The duration of annealing at the given temperature $T_1$ must be sufficiently long such that the composition of the first layer is fully equilibrated to the requisite temperature $T_1$. For this reason, the duration $t_1$ is five minutes or more, preferably ten minutes or more. When calcining in a belt calcining furnace, it is feasible to fully heat a substrate onto which the first catalytically effective composition was applied to temperature $T_1$ in this period of time. In order to ensure that all regions of the substrate and of the first composition are at temperature $T_1$, the calcination preferably takes place for ten minutes or more. More preferably, the calcination at temperature $T_1$ takes 30 minutes or more. If the substrate onto which the first catalytically effective composition has been applied is annealed, for example, in a muffle furnace, a longer period of time of approx. four hours is required to ensure that sufficient annealing takes place. The duration $t_1$ is a function of the type of furnace but is at least five minutes in order to ensure that the annealing is complete. Preferably, the duration $t_1$ is five to 300 minutes. Annealing for a duration of more than 300 minutes does not lead to any change in the composition of the multilayer catalyst. Therefore, a longer duration would only increase costs without affording a technical benefit and would therefore be uneconomical.

A multilayer catalyst produced according to the method of the invention is well-suited for exhaust gas after-treatment of combustion engines. Exhaust gases of combustion engines contain hydrocarbons and carbon monoxide, which are oxidized during the after-treatment, and nitrogen oxides from the exhaust gas are reduced. To allow the oxygen to be removed from the nitrogen oxides and, concurrently, for hydrocarbons and carbon monoxide to be oxidized, the first catalytically effective composition of the first layer (A) preferably further comprises a first oxygen storage material which comprises one or more rare earth metals.

Hereinafter, any reference in the description to first layer (A) shall be understood to mean the first catalytically effective layer. The same applies to the second layer (B), which shall be understood to mean the second catalytically effective layer (B). "Composition of the first layer (A)" shall be understood to mean the catalytically effective composition according to the invention which is applied onto the substrate structure as the first layer (A). "Composition of the second layer (B)" shall be understood to mean the catalytically effective composition according to the invention which is applied onto the substrate structure as the second layer (B).

Cerium-zirconium oxides have proven to be particularly effective oxygen storage materials. According to the present invention, cerium-zirconium oxides may be mixed oxides or mixtures of cerium oxide $CeO_2$ and zirconium oxide $ZrO_2$.

The oxygen storage material of the first catalytically effective composition therefore preferably comprises $Ce_xCr_yO_z$, in which $z=2$, preferably $x>0.5$, $y<0.5$ and $x+y=1$. These cerium-rich cerium-zirconium oxides have proven to be particularly effective oxygen storage materials in the first layer (A) of a multilayer catalyst and result in the oxygen storage material of the first layer (A) possessing a good oxygen storage capacity, in particular in combination with palladium.

Therefore, the first oxygen storage material comprises cerium, preferably in an amount of 50 wt. % to 85 wt. %, particularly preferably 60 wt. % to 80 wt. %, relative to the total weight of the first oxygen storage material of the first catalytically effective composition of the first layer (A). The first oxygen storage material also comprises zirconium, preferably in an amount of 10 wt. % to 35 wt. %, particularly preferably 15 wt. % to 30 wt. %, relative to the total weight of the first oxygen storage material of the first layer (A). The addition of $ZrO_2$ to $CeO_2$ leads to improved thermal stability and thus to the multilayer catalyst having higher activity and a longer service life, as is illustrated below with regard to the second layer (B).

Preferably, the catalytically effective composition of the first layer (A) comprises a fraction of the oxygen storage material of 40 wt to 90 wt. %, more preferably a fraction of 70 wt. %, relative to the total composition of the first layer (A) being 100 wt. %.

In a preferred embodiment, the first layer (A) comprises a palladium fraction of 0.05 wt. % to 10 wt. %, particularly preferably of 0.1 wt. % to 10 wt. %, even more particularly preferably of 0.5 wt. % to 5 wt. %, relative to the total composition of the first layer (A) being 100 wt. %. The use of palladium in combination with an oxygen storage material results in slower incorporation and retrieval of oxygen into and from the material but increases the oxygen storage capacity of the oxygen reservoir.

According to the invention, the second catalytically effective composition of the second layer (B) preferably comprises a second oxygen storage material. In this context, the first oxygen storage material of the first catalytically effective composition of the first layer (A) and the second oxygen storage material of the second catalytically effective composition of the second layer (B) may be the same or different from each other.

The catalytically effective composition of the second layer (B) preferably comprises an oxygen storage material which comprises one or more rare earth metals. Preferably, the rare earth metals are present as oxides, and the composition of the second layer (B) comprises, in particular, a fraction in the range of 70 wt. % to 90 wt. %, preferably 90 wt. %, relative to the total composition of the second layer (B) being 100 wt. %. The fraction of rare earth metals in the form of an oxide relates to the entire substance content of the second layer (B).

The oxygen storage material of the composition of the second layer (B) preferably comprises a cerium-zirconium oxide ($Ce_xZr_yO_z$). More preferably, the material comprises a cerium-rich cerium-zirconium oxide, in which the fraction of cerium oxide $CeO_2$ relative to the total oxide, is 50 wt. % or more and the fraction of zirconium oxide $ZrO_2$ is lower than the fraction of cerium oxide $CeO_2$. The oxygen storage material of the second layer (B) therefore contains $Ce_xCr_yO_z$, in which $z=2$, preferably $x>0.5$, $y<0.5$ and $x+y=1$. Cerium-zirconium oxides are known in the prior art as oxygen storage materials in multilayer catalysts and it has been shown that, in particular, cerium-rich oxygen storage materials are particularly well-suited.

The second oxygen storage material of the second catalytically effective composition may comprise a fraction of $CeO_2$ in the range of 50 wt. % to 80 wt. %, in particular 60 wt. % $CeO_2$, relative to the total composition of the second layer (B) being 100 wt. %. It also comprises zirconium oxide, preferably in an amount of 10 wt. % to 50 wt. %, more preferably 20 wt. % to 40 wt. %, even more preferably 30 wt. %, relative to the total weight of the second oxygen storage material of the second catalytically effective composition being 100 wt. %.

The thermal stability of the oxygen storage material is relevant to the conversion rate attained by the multilayer catalyst. The first and second oxygen storage materials are porous materials. The catalytically active noble metal centers are situated both on the external surface of the oxygen storage material and in the pores. In operation, the exhaust gas flows onto the oxygen storage material of the catalytically effective layer. Since the surface is porous, the flows become turbulent, which leads to improved contact between the catalytically effective layer and the exhaust gases to be treated.

If the pore size of the oxygen storage material is too small, the exhaust gas flows exclusively along the surfaces of the oxygen storage material. However, the catalytically effective noble metal is situated not only on the surface, but also on the inside of the oxygen storage material in the pores thereof. If the pore size is too small, the noble metal situated on the inside is not available during operation for treatment of the exhaust gas. Mainly, the pore volume and the pore radius, as well as the size of the orifice of the pores, are crucial in this context. These must be maintained, at least in part, during both production and in operation. The pore volume is usually in the range of 0.2 to 10.0 ml/g, in particular in the range of 0.3 to 0.8 ml/g. The average pore radii are approx. 5 to 20 nm, in particular 7 to 12 nm.

In the preferred cerium-zirconium oxide according to the invention, the structure of pure cerium oxide is interrupted by the zirconium oxide. This leads to a change of the pore volume and pore radius of the oxygen storage material. In particular, the thermal stability of the structure is increased. The pores of the cerium-zirconium oxide remain stable even during operation at temperatures above 500° C. Therefore, in operation, the entire amount of noble metal present is available for reaction with the exhaust gas. It has been shown that a fraction of at least 10 wt. % zirconium oxide in the oxygen storage material provides for sufficient thermal stability. However, too large a fraction of zirconium oxide (>45%) leads to a decrease of the oxygen storage capacity of the oxygen storage material.

According to the invention, the second catalytically effective composition comprises at least one of platinum and rhodium. The composition preferably comprises a fraction of these noble metals of 0.005 wt. % to 2.0 wt. %, particularly preferably 0.01 wt. % to 1.0 wt. %, even more preferably 0.02 wt. % to 0.8 wt. %, relative to the total composition of the second layer (B) being 100 wt. %. Such weight fractions are required in order to provide for sufficient catalytic activity. The use of platinum and/or rhodium in the composition enables rapid incorporation and retrieval of oxygen into and from the oxygen storage material. When the exhaust gas to be treated contacts the composition according to the invention, nitrogen oxides can be reduced rapidly by removing the oxygen from the reaction equilibrium and storing it in the oxygen reservoir. Lower amounts of platinum and/or rhodium do not provide for sufficient conversion of nitrogen oxides by the catalyst.

In this context, the mass ratio of platinum to rhodium is preferably 9:1 to 1:9, more preferably 7:1 to 1:5, even more preferably 5:1 to 1:3. It has been shown that the conversion of nitrogen oxide is particularly effective at these ratios.

In order to improve the exhaust gas treatment, the composition of the second layer (B) preferably comprises platinum and/or rhodium. The composition of the first layer (A) may comprise palladium. It has been found that the effect of the noble metals in the conversion of the exhaust gases is particularly high if these are present in separate layers. Specifically, palladium should be present separate from platinum and rhodium. The catalyst heats up in operation and, as a result, aggregates of the noble metals may be formed. Specifically, palladium tends to form aggregates. If palladium is present in a layer together with platinum and/or rhodium, mixed aggregates are formed, which have a clearly lower catalytic activity as compared to the pure noble metals.

According to a preferred embodiment of the invention, due to the presence of palladium in the catalytically effective composition, the first layer (A) has a higher oxygen storage capacity than the second layer (B), which comprises a composition containing platinum and/or rhodium. Based on the oxygen storage capacity of the first layer (A) being 100%, the oxygen storage capacity of the second layer is preferably 50% to 80%, particularly preferably 70%. Accordingly, the oxygen storage capacity of the first layer (A) is 1.25-fold to 2-fold, in particular 1.4-fold, higher than the oxygen storage capacity of the second layer (B).

Surprisingly, it has been found that multiple annealing of the first layer (A) during the inventive production of a catalyst improves its catalytic activity. In this context, the first layer (A) is first annealed at a first temperature $T_1$ and then at a second temperature $T_2$ higher than temperature $T_1$. Preferably, the second temperature $T_2$ is higher by 100° C. to 400° C. than temperature $T_1$. Preferably, the first annealing takes place at a temperature $T_1$ in a range of 400° C. to 700° C. and the subsequent annealing takes place at a temperature $T_2$ in a range of 700° C. to 1200° C. More preferably, temperature $T_2$ is in a range of 750° C. to 950° C. Temperature $T_1$ more preferably is in a range of 500° C. to 650° C. In these temperature ranges, the catalytic activity of the catalyst produced according to the invention is particularly high. Higher temperatures do not lead to further improvement of the pollutant decomposition by the catalyst according to the invention.

At temperatures of more than 1200° C., the structure of the substrate may be destroyed such that the catalyst cannot be used or has a shortened service life. The temperature range for $T_2$ essentially corresponds to the temperatures which also arise during the operation of a combustion engine, for example in a motor vehicle or a motorcycle.

Tables 1 and 2 show exhaust gas measurements of combustion engines. In this context, the exhaust gases were guided both over catalysts produced according to conventional methods (Nos. 1 to 8) and catalysts produced according to the invention (Nos. 9 to 14). Table 1 and Table 2 show the measurements for rich and lean motor operation, respectively. The oxidic substrate materials of the catalysts are shown in Tables 3 and 4 below.

TABLE 1

Exhaust Gas Measurements of Combustion Engines

| Cat. No. | Amount of noble metal [wt. %] | Ratio of noble metals [Pt:Pd:Rh] | rich motor operation | | | | | |
|---|---|---|---|---|---|---|---|---|
| | | | $NO_x$ [g/km] | CO [g/km] | HC [g/km] | $T_1$ [° C.] | $T_2$ [° C.] | $T_3$ [° C.] |
| 1 | 1.94 | 2:7:1 | 29 | 98 | 98 | 550 | — | 550 |
| 2 | 1.94 | 2:7:1 | 33 | 98 | 99 | 550 | — | 550 |
| 3 | 1.77 | 2:7:1 | 34 | 95 | 99 | 950 | — | 550 |
| 4 | 1.77 | 2:7:1 | 18 | 94 | 98 | 950 | 950 | 550 |
| 5 | 1.77 | 2:7:1 | 31 | 96 | 99 | 700 | — | 550 |
| 6 | 1.41 | 2:55:3 | 26 | 95 | 99 | 550 | — | 550 |
| 7 | 1.41 | 2:55:3 | 30 | 95 | 99 | 750 | — | 550 |
| 8 | 1.77 | 0:10:1 | 25 | 95 | 98 | 750 | — | 550 |
| 9* | 1.94 | 2:7:1 | 17 | 94 | 98 | 550 | 950 | 550 |
| 10* | 1.94 | 2:7:1 | 15 | 97 | 97 | 550 | 950 | 550 |
| 11* | 1.77 | 2:7:1 | 18 | 94 | 98 | 700 | 950 | 550 |
| 12* | 1.41 | 2:55:3 | 14 | 92 | 95 | 550 | 950 | 550 |
| 13* | 1.41 | 2:55:3 | 16 | 94 | 98 | 750 | 950 | 550 |
| 14* | 1.77 | 0:10:1 | 15 | 94 | 98 | 750 | 950 | 550 |

*catalysts produced according to the invention

Column 2 of Table 1 also shows the total amount of noble metal present on the catalyst. The vales given in wt. % relate to the total composition of first layer (A) and second layer (B) being 100 wt. %

Column 3 of Table 1 shows the ratio of the noble metals present in the catalyst, which is the mass ratio and corresponds to the ratio of Pt:Pd:Rh.

TABLE 2

Exhaust Gas Measurements of Combustion Engines

| Cat. No. | lean motor operation | | | | | |
|---|---|---|---|---|---|---|
| | $NO_x$ [g/km] | CO [g/km] | HC [g/km] | $T_1$ [° C.] | $T_2$ [° C.] | $T_3$ [° C.] |
| 1 | 73 | 74 | 97 | 550 | — | 550 |
| 2 | 73 | 73 | 96 | 550 | — | 550 |
| 3 | 74 | 73 | 98 | 950 | — | 550 |
| 4 | 48 | 62 | 84 | 950 | 950 | 550 |
| 5 | 75 | 74 | 99 | 700 | — | 550 |
| 6 | 71 | 74 | 97 | 550 | — | 550 |
| 7 | 73 | 74 | 98 | 750 | — | 550 |
| 8 | 72 | 74 | 98 | 750 | — | 550 |
| 9* | 41 | 58 | 75 | 550 | 950 | 550 |
| 10* | 41 | 58 | 75 | 550 | 950 | 550 |

TABLE 2-continued

Exhaust Gas Measurements of Combustion Engines lean motor operation

| Cat. No. | $NO_x$ [g/km] | CO [g/km] | HC [g/km] | $T_1$ [° C.] | $T_2$ [° C.] | $T_3$ [° C.] |
|---|---|---|---|---|---|---|
| 11* | 58 | 67 | 91 | 700 | 950 | 550 |
| 12* | 37 | 54 | 72 | 550 | 950 | 550 |
| 13* | 46 | 63 | 83 | 750 | 950 | 550 |
| 14* | 50 | 66 | 87 | 750 | 950 | 550 |

*catalysts produced according to the invention

The exhaust gas levels were determined in accordance with the Euro-3 standard (test cycle: cycle specified in ordinance ECE R40) in all examples. Table 3 below shows the compositions of the oxidic materials as used in the catalysts produced according to the invention.

TABLE 3

Compositions of Oxidic Materials

| Oxidic material | $CeO_2$ [wt. %] | $ZrO_2$ [wt. %] | $La_2O_3$ [wt. %] | $Pr_6O_{11}$ [wt. %] | $Al_2O_3$ [wt. %] | $La_2O_3$ [wt. %] | BET [m²/g] |
|---|---|---|---|---|---|---|---|
| OM 1 | 60 | 30 | 3 | 7 | | | 49 |
| OM 2 | | | | | 97.1 | 2.9 | 131 |

Table 4 below shows the oxidic substrate materials of the first layer (A) and second layer (B) of the catalysts shown in Tables 1 and 2. The first layer (A) and the second layer (B) each comprises an oxygen storage material (oxidic material No. 1) and doped aluminum oxide (oxidic material No. 2). $Al_2O_3$ is added to the compositions to add up to 100 wt. %.

TABLE 4

Composition of the oxidic materials of the catalysts

| Cat. No. | First layer | Second layer |
|---|---|---|
| 1 | 30 wt. % OM 1 | 65 wt. % OM 1 |
| | 53 wt. % OM 2 | 25 wt. % OM 2 |
| 2 | 30 wt. % OM 1 | 65 wt. % OM 1 |
| | 53 wt. % OM 2 | 25 wt. % OM 2 |
| 3 | 30 wt. % OM 1 | 65 wt. % OM 1 |
| | 53 wt. % OM 2 | 25 wt. % OM 2 |
| 4 | 30 wt. % OM 1 | 65 wt. % OM 1 |
| | 53 wt. % OM 2 | 25 wt. % OM 2 |
| 5 | 55 wt. % OM 1 | 65 wt. % OM 1 |
| | 40 wt. % OM 2 | 25 wt. % OM 2 |
| 6 | 55 wt. % OM 1 | 80 wt. % OM 1 |
| | 40 wt. % OM 2 | 15 wt. % OM 2 |
| 7 | 55 wt. % OM 1 | 80 wt. % OM 1 |
| | 40 wt. % OM 2 | 15 wt. % OM 2 |
| 8 | 55 wt. % OM 1 | 50 wt. % OM 1 |
| | 40 wt. % OM 2 | 45 wt. % OM 2 |
| 9* | 30 wt. % OM 1 | 65 wt. % OM 1 |
| | 53 wt. % OM 2 | 25 wt. % OM 2 |
| 10* | 30 wt. % OM 1 | 65 wt. % OM 1 |
| | 53 wt. % OM 2 | 25 wt. % OM 2 |
| 11* | 55 wt. % OM 1 | 65 wt. % OM 1 |
| | 40 wt. % OM 2 | 25 wt. % OM 2 |
| 12* | 55 wt. % OM 1 | 80 wt. % OM 1 |
| | 40 wt. % OM 2 | 15 wt. % OM 2 |
| 13* | 55 wt. % OM 1 | 80 wt. % OM 1 |
| | 40 wt. % OM 2 | 15 wt. % OM 2 |
| 14* | 55 wt. % OM 1 | 50 wt. % OM 1 |
| | 40 wt. % OM 2 | 45 wt. % OM 2 |

*catalysts produced according to the invention

As shown in Tables 1 and 2, the emission of pollutants by combustion engines with a catalyst produced according to the invention is lower than conventional catalysts. In this context, the emission of nitrogen oxides $NO_x$, carbon monoxide CO, and hydrocarbons HC is clearly lower in lean motor operation if catalysts produced according to the invention, rather than conventional motors, are used. A decrease of the emission of pollutants is observed in rich motor operation as well. Specifically, the emission of nitrogen oxides $NO_x$ decreased as compared to conventional catalysts.

As shown from the measurements, it is important that the first layer (A) is annealed at two different temperatures $T_1$ and $T_2$, in which $T_2$ is higher than $T_1$. If the first layer is annealed only once at temperature $T_2$ (catalyst 3), the emission of pollutants is essentially the same as with catalysts that have been annealed at a temperature $T_1$ of 550° C. (catalysts 1 and 2).

Annealing twice at a temperature $T_2$, as for catalyst 4, also does not lead to a further decrease of the pollutants in the exhaust gases. The first temperature treatment at a temperature $T_1$ of 950° C. therefore does not lead to an improvement in the catalytic activity of the catalyst as compared to a temperature treatment according to the invention in a preferred temperature range $T_1$ of 400° C. to 700° C. The temperature $T_1$ being this high therefore only leads to an increase in costs, since this temperature needs to be attained for both the first annealing step at temperature $T_1$ and for the second annealing step at temperature $T_2$.

The annealing of the first layer (A) at both temperatures $T_1$ and $T_2$ may take place in a furnace, for example in a chamber furnace or a belt calcining furnace, and may be performed in an air flow. However, the annealing may also be carried out with forming gas or inert gas. The same applies to the annealing of the second layer (B) at temperature $T_2$ and the annealing at temperature $T_3$.

It is within the scope of the invention to first cool down the substrate provided with the first composition to room temperature after annealing at temperature $T_1$ in step c) and then to only anneal at temperature $T_2$ in step d). It is also within the scope of the invention to perform the annealing at temperature $T_2$ in step d) immediately after the annealing at temperature $T_1$ in step c).

The application of the first and second composition in steps b) and e) of the method according to the invention both take place at room temperature. For the purposes of this disclosure, the terms first composition and second composition shall be understood to mean the first catalytically effective composition and the second catalytically effective composition, respectively.

The annealing at temperatures $T_1$, $T_2$ and/or $T_3$ may be performed at elevated atmospheric humidity. Accordingly, an atmospheric humidity of 3% water may be present in the furnace. A total of 3% water means that 3 vol. % water vapor (gaseous water) is present in the furnace. The annealing may take place, for example, in a gas flow that consists of 97 vol. % nitrogen and 3 vol. % water vapor.

The annealing at temperatures $T_1$, $T_2$, and $T_3$ preferably takes place for a duration of ten to 300 minutes, particularly preferably for thirty to 240 minutes. The respective layer is fully heated in this period of time. This cannot be ensured if the duration of annealing is shorter. Also, heating for a longer period of time has no further impact on the catalytic activity of the catalyst and would only generate additional costs.

After annealing the first layer (A) twice (at a first temperature $T_1$ and a second temperature $T_2$), the method according to the invention involves application of a second catalytically effective composition, which comprises platinum and/or rhodium, onto the annealed first layer (A). As a result, a second layer (B) is obtained. This layer is annealed at a third temperature $T_3$. Temperature $T_3$ is preferably in a range of 400° C. to 700° C., particularly preferably in a range of 500° C. to 650° C. These temperatures provide for sufficient strength of the second layer (B) on the first layer (A) to the extent that (A) is covered by the second layer (B). Moreover, good adhesion to the substrate is enabled. The annealing is also associated with the formation of noble metal particles which are then effective as active centers on the surface of the catalyst.

Figure 1:
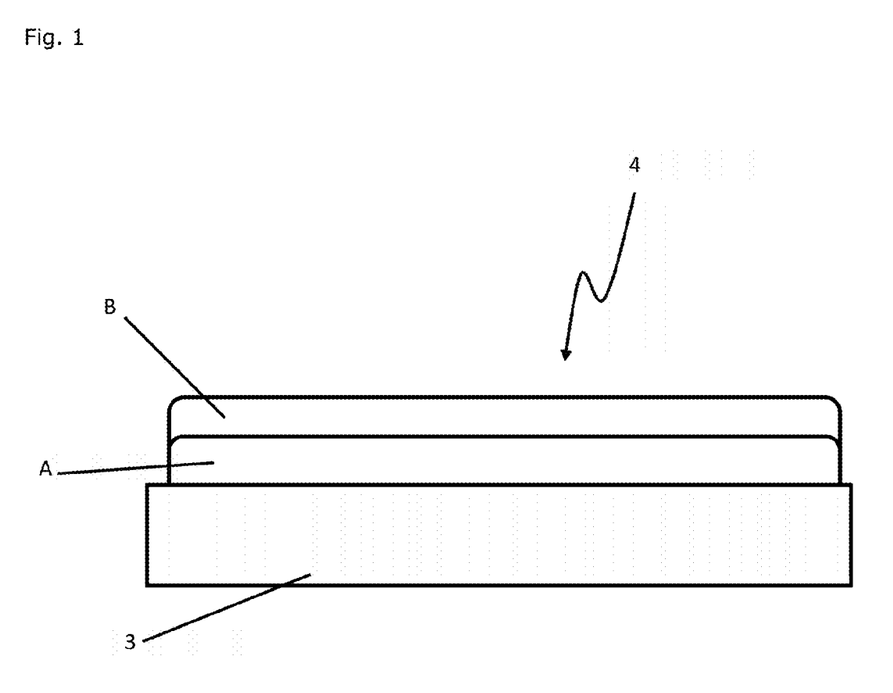
FIG. 1 schematically shows the design of a multilayer catalyst according to an embodiment of the invention having a substrate, a first layer (A), and a second layer (B)

The second layer (B) may be fully or partially applied onto the annealed first layer (A). If it is fully applied, the second layer (B) covers the first layer (A). In this case, there is no contact between the second layer (B) and the substrate. FIG. 1 schematically shows this embodiment of the invention. If applied partially, there is contact between the second layer (B) and the first layer (A) as well as between the second layer (B) and the substrate. In this case, the second layer (B) does not fully cover the surface of the first layer (A), as shown schematically in FIG. 2. Preferably, the second layer (B) covers at least 50%, preferably at least 60%, more preferably at least 75%, even more preferably at least 85%, specifically at least 90% or 95%, particularly preferably a range of 60% to 95%, preferably of 70% to 90%, in particular 72% to 88%, of the surface of the first layer (A). It has been found in this context that a ratio of the length of the first layer (A) along the flow direction to the length of the second layer (B) along the flow direction in a range of 1:2 to 2:1, preferably of 1:1.5 to 1.5:1, in particular of 1:1.2 to 1.2:1, is particularly preferred.

Partial coverage of the first layer (A) by the second layer (B) is preferred over complete coverage because the conversion rate of the catalyst is lower if the coverage is complete. Moreover, there is a negative effect when the first layer (A) is arranged downstream of the second layer (B) in flow direction, i.e., when there is no overlap of the two layers. In this type of zone coating, in which there is little or no overlap of the two layers, the CO emission is clearly higher than with a layered coating, in which the first layer (A) and second layer (B) overlap according to the invention. Accordingly, the conversion of the exhaust gas flowing from the combustion engine is poorer, as is evident from Table 5 below.

TABLE 5

Conversion of Exhaust Gas

| Type of coating | CO [g/km] | $NO_x$ [g/km] |
| --- | --- | --- |
| Zone coating | 0.507 | 0.094 |
| Layered coating | 0.368 | 0.107 |
| Zone coating, aged | 0.912 | 0.127 |
| Layered coating, aged | 0.625 | 0.127 |

The values in Table 5 are the emission levels, i.e., the amount of CO and $NO_x$ measured according to the official measuring cycle after passage through the catalyst. An overall deterioration of the emission results both upon zone coating and layered coating if the layers were aged, i.e., subjected to a temperature treatment. However, even after ageing, the emission limits of 2.0 g/km for CO and 0.15 g/km for $NO_x$ are still met.

It is feasible during the production of a multilayer catalyst according to the invention to heat the first layer (A) and/or the second layer (B) before annealing. The heating in this context takes place at a temperature of 200° C., in particular at a temperature in the range of 80° C. to 170° C., particularly preferably in the range of 100° C. to 150° C. The heating dries the first layer (A) and/or the second layer (B). Drying results in a decrease of the volatile components of the composition and thus a first adhesion of the composition to the substrate such that further processing is facilitated. In order to remove solvent contained in the composition to the extent possible, the drying preferably takes place in a gas flow, in particular in an air flow. If the respective compositions (first and second catalytically effective composition) are annealed without first drying, there may be problems related to the adhesion of the compositions to the substrate. In this case, a moisture gradient is formed in the composition applied to the substrate. Depending on the extent of this moisture gradient, fissures may be formed in the applied composition, i.e., in the first layer (A) and/or second layer (B), which cause the layer or layers to no longer be able to adhere to the substrate, which reduces the service life of a catalyst produced according to the invention.

The first layer (A) and/or second layer (B) are preferably loaded with the corresponding catalytically effective composition in the range of 40 g/L to 150 g/L, more preferably 75 g/L. The loading indicates the amount of composition applied relative to the void volume of the catalyst (of the substrate) in liters.

The oxygen storage material of the first layer (A) and the oxygen storage material of the second layer (B) are preferably one or more metals selected from the group consisting of neodymium, praseodymium, lanthanum, and hafnium. Preferably, the metals are present in the form of the oxides thereof. In this context, the fraction of the respective metal oxides may be 2 wt. % to 10 wt. %, preferably 3 wt. % to 7 wt. %, relative to 100 wt. % of the oxygen storage material.

Doping the oxygen storage material at the levels indicated leads to the oxygen storage material showing improved thermal stability. This effect is hardly noticeable if the fraction is less than 2 wt. %. Higher fractions of more than 10 wt. % do not increase the stability any further. Moreover, the addition of praseodymium, lanthanum, neodymium and/or hafnium, in particular in the form of the oxides thereof, accelerates the incorporation and retrieval of oxygen into and from the oxygen storage material.

The first oxygen storage material and/or the second oxygen storage material may comprise lanthanum oxide in an amount of 0.1 to 8 wt. %, preferably 2 to 6 wt. %, relative to the total weight of the respective oxygen storage material being 100 wt. %. Moreover, it is feasible that the first oxygen storage material and/or the second oxygen storage material may comprise praseodymium oxide in an amount of 0.1 wt. % to 10 wt. %, preferably 0.01 wt. % to 7 wt. %, relative to the respective oxygen storage material accounting for 100 wt. %.

Doping also allows the BET surface area of the oxygen storage materials to be set. During the production and/or in operation of a multilayer catalyst, a catalyst is exposed to high temperature stress. In order to determine the stability of the pore structure of the oxygen storage materials, these are subjected to a temperature of 1000° C. for a period of approx. 3 to 8 hours. The BET surface area is determined following this temperature treatment. Oxygen storage materials consisting of cerium oxide and zirconium oxide comprise a BET surface area of 20 $m^2$/g or less after a temperature treatment at 1000° C.

Table 6 below shows the corresponding BET surface area of different oxygen storage materials after temperature treatment at 1000° C. The oxygen storage materials No. 1 and No. 5 consist of $CeO_2$ and $ZrO_2$ and comprise a BET surface area of less than 20 m²/g. Doping with oxides of praseodymium, lanthanum, neodymium and/or hafnium increases the BET surface area after temperature treatment. Accordingly, the thermal stability of the oxygen storage materials is increased by the doping.

TABLE 6

BET Surface Area of Oxygen Storage Materials

| Oxygen storage material | $CeO_2$ [wt. %] | $ZrO_2$ [wt. %] | $Nd_2O_3$ [wt. %] | $La_2O_3$ [wt. %] | $Y_2O_3$ [wt. %] | $Pr_6O_{11}$ [wt. %] | BET [m²/g] |
|---|---|---|---|---|---|---|---|
| No. 1 | 70 | 30 | | | | | 17 |
| No. 2 | 56 | 39 | 5 | | | | 28 |
| No. 3 | 65 | 27 | | 8 | | | 30 |
| No. 4 | 60 | 25 | 5 | 2 | 8 | | 33 |
| No. 5 | 58 | 42 | | | | | 16 |
| No. 6 | 60 | 30 | | 3 | | 7 | 49 |
| No. 7 | 68 | 24 | | 5 | | 3 | 17 |

Doping of the oxygen storage material of the second layer (B) according to the invention with oxides of praseodymium, lanthanum, neodymium and/or hafnium leads to a decrease of the oxygen storage capacity. For example, a catalytically effective layer according to the invention comprising an oxygen storage material that consists of 75 wt. % $CeO_2$ and 25 wt. % $ZrO_2$ and palladium has an oxygen storage capacity of approx. 800 μmol CO/g. In contrast, an oxygen storage material that consists of just cerium oxide has an oxygen storage capacity of approx. 730 μmol CO/g.

Replacing the oxygen storage material with a doped cerium-zirconium oxide causes the oxygen storage capacity to decrease. For example, doping the oxygen storage material with 4 wt. % lanthanum oxide leads to an oxygen storage capacity of 710 μmol CO/g, whereas doping with 12 wt. % lanthanum oxide leads to a capacity of approx. 600 μmol CO/g.

The oxygen storage capacity may be determined, for example, by CO chemisorption. For this purpose, the sample to be analyzed is first fully oxidized with oxygen at a certain temperature (350° C.). Then the sample is exposed to "pulses" (doses of CO) until no oxygen for oxidation of CO remains in the sample. The gas flowing through the sample to be analyzed is then detected. Analysis of the area under the peaks in the detection process allows the amount of converted CO to be determined, which is a measure of the oxygen storage capacity. The oxygen storage capacity is therefore reported in units of μmol CO per gram of catalytically effective composition.

Accordingly, the properties of the catalytically effective layer may be set by the amount of neodymium, praseodymium, lanthanum, and hafnium added to the oxygen storage material of the first layer (A) and/or second layer (B). These materials may be used to influence, and set according to need, the thermal stability, oxygen storage capacity, and the rate of oxygen incorporation and retrieval.

The composition of the first layer (A) and/or the composition of the second layer (B) preferably has a particle size d90 in the range of 10 μm to 35 μm, more preferably in the range of 15 μm to 30 μm, particularly preferably in the range of 19 μm to 24 μm. d90 denotes a particle size, in which 90% of the particles are smaller than the value d90.

Surprisingly, it has been found that the exhaust gases from combustion engines are decomposed particularly well in the composition according to the invention having a particle size d90 in the range of 10 μm to 35 μm, preferably in the range of 15 μm to 30 μm, particularly preferably in the range of 19 μm to 24 μm. In particular for lean conditions, the emission of hydrocarbons, carbon monoxide, and nitrogen oxides may be decreased markedly compared to compositions having particle sizes of less than 10 μm. Specifically, the emission of carbon monoxide decreases markedly if the motor is operated at rich conditions. Concurrently, the emission of carbon dioxide may be kept low as well.

Figure 3:
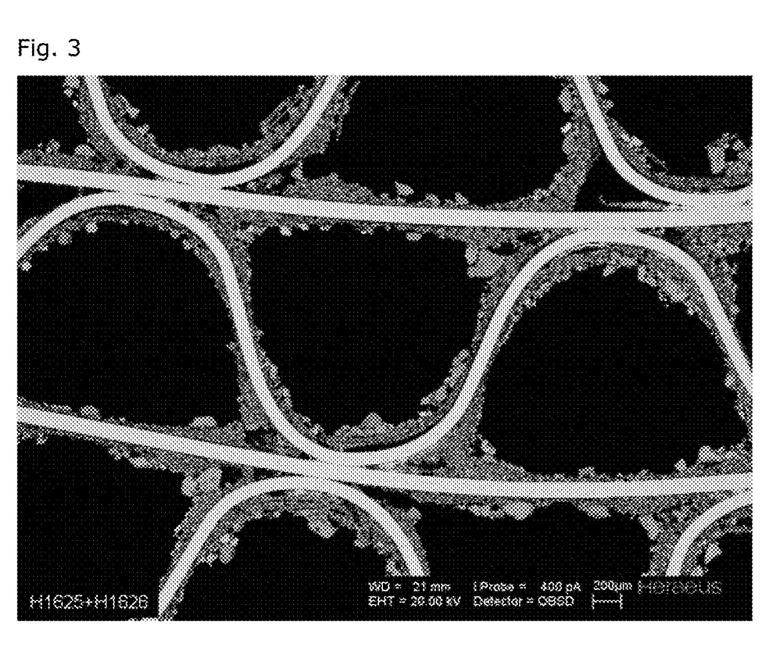
FIGS. 3 and 4 are SEMs of a coated catalyst substrate.
Figure 4:
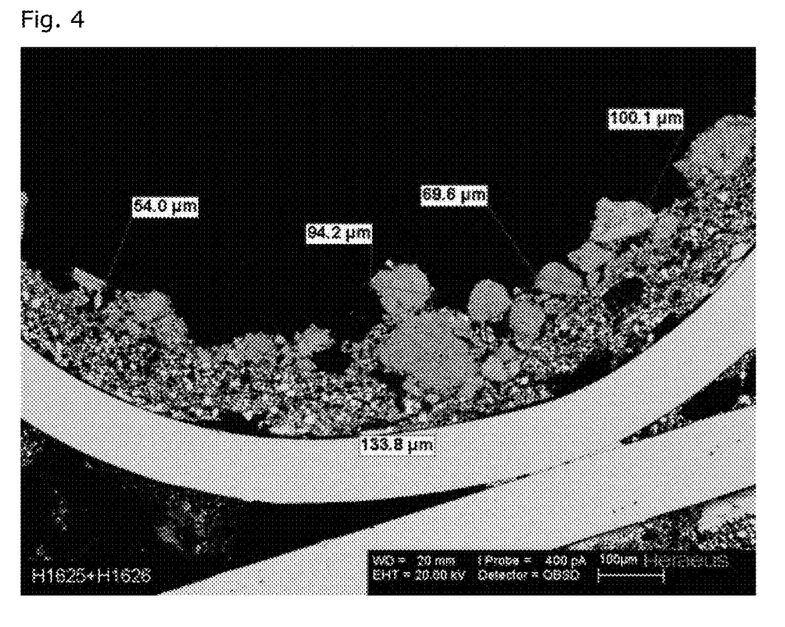

If the particle size d90 is above 35 μm, the use in a catalyst is no longer beneficial. If a catalyst substrate is coated with a composition of this large particle size, the particles are no longer present in mutually interlinked form. Rather, agglomerates are formed. FIG. 3 shows a scanning electron micrograph (SEM), in which the particle size d90 of the second layer is higher than 35 μm. The particle size of the individual particles in the second layer can be seen in FIG. 4. FIG. 4 shows details from FIG. 3.

The particle size of the composition may also be defined by means of the particle sizes d50 and d10. Accordingly, 50% and 10%, respectively, of the particles are smaller than the value given. The composition of the first layer (A) and/or the composition of the second layer (B) preferably has a particle size d50 in the range of 2.5 μm to 11.5 μm, more preferably of 4 μm to 10 μm, particularly preferably of 5.5 μm to 8.5 μm. Also, it preferably has a particle size d10 in the range of 1 μm to 4 μm, more preferably 1 μm to 2 μm, particularly preferably 1.0 μm to 1.8 μm.

In the present application, the terms, "particle size" and "particle size distribution" are used as synonyms and each refers to the particle size distribution determined with a CILAS 920 laser granulometer of Quantachrome (Odelzhausen, Germany) in accordance with ISO 13320. A low-energy laser diode with 3 mW power and a wavelength of 830 nm was used in the measurement.

The catalytically effective composition of the first layer (A) and/or the catalytically effective composition of the second layer (B) may further comprise gamma-aluminum oxide (γ-$Al_2O_3$), in particular lanthanum oxide $La_2O_3$-doped γ-$Al_2O_3$. The $La_2O_3$ content, relative to the amount of $Al_2O_3$, is preferably in the range of 2 wt. % to 4 wt. %, particularly preferably 3 wt. %.

γ-$Al_2O_3$ has an influence on the adhesion of the composition on the surface on the inside of the substrate. The first layer (A) is fully applied onto the substrate material of the multilayer catalyst according to the invention, whereas the second layer (B) is partially applied onto the first layer (A) and partially onto the substrate material. Therefore, the composition of the first layer (A) preferably comprises a higher fraction of γ-$Al_2O_3$ than the composition of the second layer (B). If the fraction of γ-$Al_2O_3$ in the composition of the second layer (B) exceeds 30 wt. %, the $NO_x$ conversion of the layer deteriorates. Accordingly, the $NO_x$ conversion of the multilayer catalyst according to the invention improves with increasing fraction of oxygen storage material in the second layer. By reducing the amount of oxygen storage material used in a catalyst according to the invention by half and replacing it with γ-$Al_2O_3$, the $NO_x$ emission increases by approx. 25 to 30%. If oxygen storage materials according to the invention having γ-$Al_2O_3$ fractions of 30 wt. % or less are used, the emission of nitrogen oxides ($NO_X$) is approximately 0.0099 g/km (grams of $NO_X$ per kilometer travelled). By reducing the amount of oxygen storage material by half, this value increases to 0.125 g/km.

γ-$Al_2O$ preferably has a particle size of d90 in the range of 10 μm to 35 μm, more preferably in the range of 15 μm to 30 μm, particularly preferably in the range of 19 μm to 24 μm. Surprisingly, it has been found that the treatment of exhaust gases was improved through the use of a composition having particle sizes in the specified range as compared to compositions having smaller particle sizes. Smaller particle sizes are usually obtained through a step of grinding, but no such step is required in the present invention.

The γ-aluminum oxide preferably has a large BET surface area. The BET surface area of γ-$Al_2O_3$ is usually approx. 200 $m^2/g$. At high temperatures, as arise, for example, during the annealing during the production method according to the invention or in operation of a catalyst, this value decreases to approx. 40 $m^2/g$ to 50 $m^2/g$. Doping with lanthanum oxide attains higher thermal stability of γ-$Al_2O_3$. Even after thermal treatment, the BET surface area of γ-$Al_2O_3$ doped according to the invention is still in a range of more than 70 $m^2/g$, particularly preferably 90 $m^2/g$.

The BET surface area is also referred to as specific surface area and may be determined according to the BET method that is known according to the prior art. In the measurement, a gas, often nitrogen, is guided across the material to be tested. The BET equation is used to calculate from an adsorbed amount of gas the amount of adsorbate that forms a layer, the so-called monolayer, on the surface of the tested object. The BET surface area is equivalent to the number of mol Vm in the monolayer multiplied by Avogadro's number $N_A$ and the space needs of a gas molecule (nitrogen: 0.162 $nanometer^2$).

Preferably, the amount of aluminum oxide in the first layer (A) is 5 wt. % to 40 wt. %, more preferably 10 wt. % to 30 wt. %, relative to the total weight of the first layer (A) being 100 wt. %. A larger amount of aluminum oxide would lead to the first layer (A) having a decreased oxygen storage capacity, which, in turn, would lead to the activity of the catalyst being lower.

Preferably, the amount of aluminum oxide in the second layer (B) is 1 wt. % to 40 wt. %, particularly preferably 5 wt. % to 30 wt. %, relative to the total weight of the second layer (B) being 100 wt. %. A minimal fraction of aluminum oxide is required both in the first layer (A) and in the second layer (B) in order to enable good adhesion to the substrate material. However, too large an amount of aluminum oxide leads to a reduction of the catalytic activity.

The catalytically effective composition according to the invention preferably comprises the oxygen storage material, at least one noble metal, and aluminum oxide. Providing this composition comprises the following steps:

i. placing the oxygen storage material in water;

ii. adding noble metal or noble metals in the form of one of the salts thereof in solution; and iii. placing aluminum oxide into the slurry obtained in step (ii).

In this context, the pH is preferably maintained in a range of 4 to 5 during the addition of the solution in step (ii). This is done using alkaline solvents that are known according to the prior art. Preferably, the pH value is adjusted using ammonia ($NH_3$). This enables effective application of the noble metal/noble metals onto the oxygen storage material. Surprisingly, it has been found that the light-off temperature of the multilayer catalyst according to the invention is better with regard to all emission levels (carbon monoxide CO, hydrocarbons HC, and nitrogen oxides $NO_x$) if ammonia is used to adjust the pH value rather than other bases, as shown in Table 7 below.

TABLE 7

Light-Off Temperatures of Catalysts

| Base | Light-off temperature [° C.] | | |
|---|---|---|---|
| | CO | HC | $NO_x$ |
| $NH_3$ | 175 | 179 | 180 |
| Ethanolamine | 205 | 208 | 209 |
| Tetraethylammoniumhydroxide (TEAOH) | 194 | 197 | 195 |
| Ethanolamine + citric acid | 184 | 186 | 185 |

A further embodiment of the present invention relates to a multilayer catalyst obtained according to the method according to the invention. A corresponding multilayer catalyst for exhaust gas after-treatment of combustion exhaust gases comprises a substrate comprising channels for passage of gases, wherein at least some of the channels comprise an exhaust gas inlet situated upstream with respect to the flow direction of the exhaust gases and a gas outlet situated downstream. At least some of the channels comprise a first layer (A) that is applied at least to the internal surface and a second layer (B) that covers the first layer (A), wherein the first layer (A) and the second layer (B) comprise a catalytically effective composition according to the invention.

The total thickness of first layer (A) and second layer (B) is preferably 100 μm or less, particularly preferably 50 μm or less. At these layer thicknesses, the exhaust gas can flow through the catalyst unimpeded. In this context, the exhaust gas still contacts the catalytically effective compositions of the individual layers to a sufficient degree. In the scope of the present invention, the total thickness of the layers shall be understood to be the average thickness on the wall of the substrate structure. Only planar surfaces of a wall are taken into account in the determination of the thickness of the layers in this context. Regions at which two or more walls hit or touch against each other, which is associated with the formation of hollow spaces of a triangle-like shape, are not taken into account in the determination of the total thickness of the layers.

Preferably, a multilayer catalyst according to the invention therefore comprises at least a first catalytically effective composition in a first layer (A), which comprises an oxygen storage material, $La_2O_3$-doped γ-$Al_2O_3$, and palladium, and a second catalytically effective composition in a second layer (B), which comprises an oxygen storage material, $La_2O_3$-doped γ-$Al_2O_3$, and platinum and/or rhodium.

It is known from the prior art that rhodium situated on γ-$Al_2O_3$ is not available for the actual catalytic reaction or only to a limited degree. For this reason, platinum and/or rhodium in the composition of the second layer (B) are preferably present at least almost exclusively on the oxygen storage material. In the scope of the present invention, "almost exclusively" shall be understood to mean that at least 90%, preferably at least 95%, in particular at least 98%, specifically 99%, of the noble metal or noble metals are applied onto the oxygen storage material.

Surprisingly, it has been found that a balance between low light-off temperature and, concurrently, a large lambda window, may be attained if the palladium in the composition of the first layer (A) is not present almost exclusively on the oxygen storage material. In a preferred embodiment, a fraction of 30 wt. % to 40 wt. %, in particular 30 wt. %, of the palladium is situated on the γ-$Al_2O_3$, whereas 60 wt. % to 70 wt. %, in particular 70 wt. %, of the palladium is situated on the oxygen storage material. The palladium in the composition of the first layer (A) being applied almost exclusively onto the oxygen storage material has a detrimental effect on the light-off behavior of the multilayer catalyst according to the invention.

Preferably, the first layer (A) is essentially free of platinum and/or rhodium. Preferably, the second layer (B) is essentially free of palladium. In the scope of the present invention, "essentially free" shall be understood to mean that the weight ratio of palladium in the second layer (B) to palladium in the first layer (A) is preferably less than 1:10, more preferably less than 1:50, in particular less than 1:100 or less than 1:500, specifically 0, and that the weight ratio of platinum and/or rhodium in the first layer (A) to platinum and/or rhodium in the second layer (B) is preferably less than 1:10, more preferably less than 1:50, in particular less than 1:100 or less than 1:500, specifically 0.

The multilayer catalyst according to the invention comprises a substrate structure that comprises channels for passage of gases. A catalytically effective composition is applied to the internal surface of at least some of the channels. The substrate may comprise a ceramic or a metallic material in this context. Preferably, it comprises a metallic material, in particular a metallic foil that comprises iron, chromium, and aluminum.

According to the invention, the metallic foil preferably comprises an aluminum fraction of 4 wt. % to 6 wt. % and a chromium fraction of 15 wt. % to 20 wt. %. If the aluminum fraction is more than 6 wt. %, the foil is not sufficiently flexible to be made into the desired shape of the substrate structure. If the aluminum fraction is less than 4 wt. %, the catalytically effective layer does not adhere to it. It has been found that homogeneous distribution of the aluminum in the foil is important. Due to the influence of heat and oxygen, aluminum oxide is formed and migrates to the surface of the metal foil. If the concentration of aluminum on the surface is very high, a rough surface structure is formed. This takes place with foils having an aluminum fraction of more than 6 wt. % and may be observed, for example, using a scanning electron microscope. The catalytically effective layer does not, or only poorly, adhere to the rough surfaces. This way, the catalyst is not ensured to be effective.

However, such rough surfaces may also form locally. If the aluminum is not distributed homogeneously in the metallic foil, sites at which the local aluminum concentration exceeds 6% may form rough surface regions to which the catalytically effective layer also cannot adhere.

The thickness of the metallic foil is preferably in the range of 30 µm to 200 µm, preferably 100 µm. If the foil is thinner than 30 µm, it fails to have sufficient thermal stability and mechanical stability. Conversely, if the foil is more than 200 µm in thickness, it is too rigid to be made into the desired shape. Moreover, the weight of the catalyst increases.

At least some of the channels of the substrate structure comprise the first catalytically effective layer (A), which is at least partially applied to the internal surface, and the second catalytically effective layer (B), which at least partially covers the first layer (A). In this context, the second layer (B) may cover at least 50%, preferably at least 60%, more preferably at least 75%, in particular at least 85%, specifically at least 90% or at least 95% of the surface of the first layer (A).

Aside from the first layer (A) and the second layer (B), the multilayer catalyst according to the invention may comprise further catalytically active layers that contain compositions according to the invention. However, the catalyst preferably comprises only the first layer (A) and the second layer (B).

Figure 2:
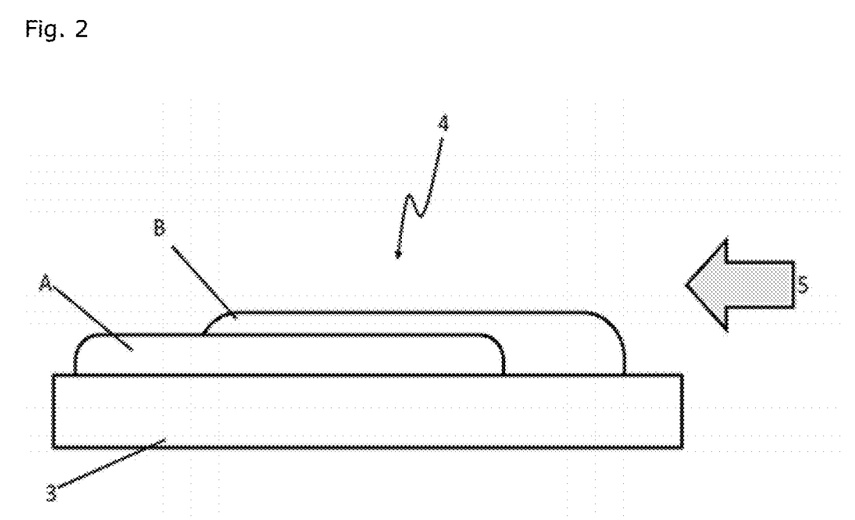
FIG. 2 shows a preferred embodiment, in which the arrow indicates the flow direction of the exhaust gas to be treated.

In a preferred embodiment, the first layer (A) and the second layer (B) are arranged appropriately such that the exhaust gas, in operation, contacts the second layer (B) first. This embodiment is shown in FIG. 2. When the exhaust gas flows from the combustion engine into the catalyst, it encounters the second layer (B) first in this embodiment. Nitrogen oxides may be reduced on this layer by removing oxygen from the reaction equilibrium. This reaction must proceed rapidly enough to attain a high conversion rate, which is made feasible by having platinum and/or rhodium present in the second layer (B). Subsequently, the exhaust gas flows to the first layer (A), which comprises palladium. Palladium present in the first layer (A) provides for slower incorporation and retrieval of oxygen into and from the oxygen storage material as compared to the second layer (B). However, the palladium increases the oxygen storage capacity of the oxygen reservoir of the first layer (A). Oxygen stored in the oxygen reservoir of the second layer (B) may therefore be released to the oxygen reservoir of the first layer (A). This prevents saturation of the oxygen reservoir of the second layer (B), which would lead to deteriorated reduction of the nitrogen oxides.

Due to the use of platinum and/or rhodium in the second layer (B) and the use of palladium in the first layer (A), the second layer (B), at operational conditions, has a higher activity with regard to the reduction of nitrogen oxides than the first layer (A).

Preferably, the multilayer catalyst according to the invention is a three-way catalyst. This is particularly preferred for exhaust gas after-treatment of four-cylinder petrol motors, in particular for exhaust gas after-treatment of motorcycles with four-cylinder petrol motors with a cubic capacity of up to 2,000 $cm^3$. The operation of these is associated with a large fluctuation of lambda in a range of 0.7 to 1.3, in particular of 0.8 to 1.2. The multilayer catalyst according to the invention can convert the exhaust gases almost completely even with these lambda fluctuations.

A multilayer catalyst according to the invention may be used, for example, in small motors, motorcycles, automotive industry, utility vehicles, industrial and special applications, and marine applications.

In a further embodiment, the underlying object of the present invention is met by an exhaust gas after-treatment system that comprises one or more motors, in particular petrol motors, and one or more multilayer catalysts according to the invention. Preferably, a four-cylinder petrol motor is connected via an exhaust gas feed to the multilayer catalyst in the exhaust gas after-treatment system.

Preferably, the motor in the exhaust gas after-treatment system is a drive unit in a vehicle or a combined heat and power unit.

In a further embodiment, the underlying object of the present invention is met by a vehicle that comprises a multilayer catalyst according to the invention or an exhaust gas after-treatment system according to the invention. The vehicle preferably comprises a four-cylinder petrol engine and is selected from the group consisting of motorcycle, JetSki, trike, and quad bike. Preferably, the vehicle is a motorcycle.

According to the invention, the present application further comprises an exhaust gas after-treatment system. This system comprises the following elements:

a) flow of an exhaust gas over a multilayer catalyst produced according to the invention, comprising a substrate, a first catalytically effective layer (A) that is at least partially applied onto the substrate, and a second catalytically effective layer (B) that at least partially covers the first layer (A);

b) contacting the exhaust gas flow to the second layer (B) and the first layer (A).

Preferably, the second layer (B), at operating conditions, has a higher activity with regard to the reduction of nitrogen oxides ($NO_x$ reduction) as compared to the first layer (A). The first layer (A) and the second layer (B) are preferably arranged appropriately such that the flow of exhaust gas reaches the second layer (B) first and is contacted thereto.

Preferably, this relates to an exhaust gas after-treatment method for the combustion exhaust gases of a four-cylinder petrol motor. This system comprises the following elements:

a) flow of a combustion exhaust gas of a four-cylinder petrol motor through the channels of a substrate structure of a multilayer catalyst according to the invention, in which at least some of the channels comprise a first catalytically effective layer (A) that is applied at least partially onto the internal surface, and a second catalytically effective layer (B) that at least partially covers the first layer (A); and b) contacting the exhaust gas flow to the second layer (B) and the first layer (A).

Preferably, the second layer (B), at operating conditions, has a higher activity with regard to the reduction of nitrogen oxides ($NO_x$ reduction) as compared to the first layer (A). The first layer (A) and the second layer (B) are preferably arranged appropriately such that the flow of exhaust gas reaches the second layer (B) first and is contacted thereto.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for producing a multilayer catalyst for exhaust gas after-treatment of combustion exhaust gases, comprising the following steps:

a) providing a substrate having a surface which contacts the gases to be cleaned;

b) preparing a first catalytically effective composition by placing a first oxygen storage material comprising $Ce_xCr_yO_z$, wherein $z=2$, $x>0.5$, $y<0.5$ and $x+y=1$ in water, adding a solution comprising a palladium salt to obtain a first slurry, and placing aluminum oxide into the first slurry, c) applying the first catalytically effective composition comprising the first oxygen storage material and the palladium salt onto the surface of the substrate to produce a first layer (A);

d) annealing the first layer (A) at a first temperature T1 in a range of 550 to 700° C. for a period of time $t_1$ of five minutes or more;

e) subsequently annealing the first layer (A) at a second temperature $T_2$ in a range of 700 to 1200° C. which is 100 to 400° C. higher than $T_1$;

f) preparing a second catalytically effective composition by placing a second oxygen storage material in water, adding a solution comprising at least one of a platinum salt and a rhodium salt to obtain a second slurry, and placing aluminum oxide into the second slurry;

g) applying the second catalytically effective composition comprising at least one of a platinum salt and a rhodium salt to produce a second layer (B), wherein the second layer (B) fully or partially covers the annealed layer (A); and h) annealing the second layer (B) at a third temperature $T_3$ in a range of 400 to 700° C.

2. The method according to claim 1, wherein at least one of the first layer (A) and the second layer (B) is heated at a temperature of 200° C. or less in a flow of gas before the annealing.

3. The method according to claim 1, wherein the first layer (A) comprises a palladium fraction of 0.05 wt. % to 10 wt. % relative to the total composition of the first layer (A) being 100 wt. %.

4. The method according to claim 1, wherein the first oxygen storage material and the second oxygen storage material are different from each other.

5. The method according to claim 1, wherein a mass ratio of platinum to rhodium in the second layer (B) is 9:1 to 1:9.

6. The method according to claim 1, wherein the catalytically effective composition of the second layer (B) comprises at least one of a platinum and a rhodium fraction of 0.005 wt. % to 2.00 wt. % relative to the total composition of the second layer (B) being 100 wt. %.

7. The method according to claim 1, wherein the annealing at the temperatures $T_1$, $T_2$, and $T_3$ takes place for a duration of ten to thirty minutes each.

8. The method according to claim 1, wherein $T_1$ is 550 to 650° C. and $T_2$ is 750 to 950° C.

* * * * *